2 Sheets—Sheet 1.

P. P. MAST & C. O. GARDINER.
Grain-Drill Feed.

No. 208,834. Patented Oct. 8, 1878.

Witnesses:
Donn P. Twitchell.
Will N. Dodge.

Inventor:
P. P. Mast
C. O. Gardiner
By Dodge & Son
attys.

2 Sheets—Sheet 2.
P. P. MAST & C. O. GARDINER.
Grain-Drill Feed.
No. 208,834. Patented Oct. 8, 1878.
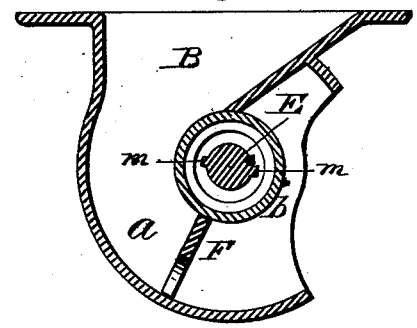
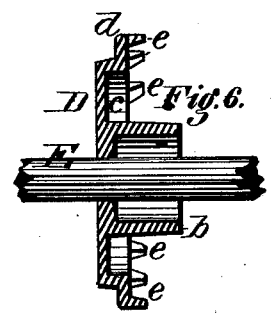
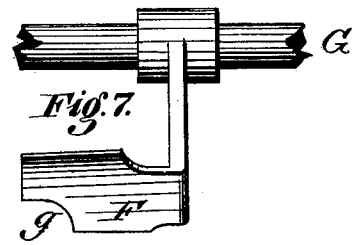
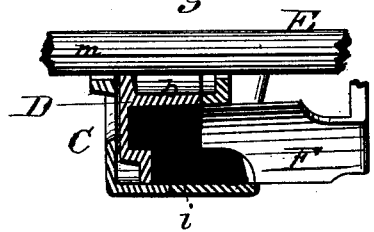
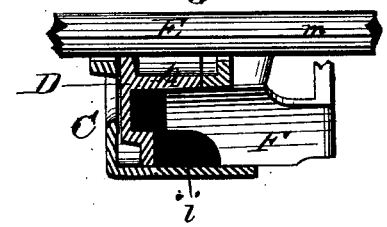
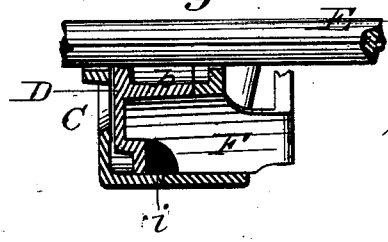
Witnesses:
Donn P. Twitchell.
Will W. Dodge.
Inventor:
P. P. Mast
C. O. Gardiner
By Dodge &Son
Atty.

UNITED STATES PATENT OFFICE.

PHINEAS P. MAST AND CHARLES O. GARDINER, OF SPRINGFIELD, OHIO, ASSIGNORS TO P. P. MAST & CO., OF SAME PLACE.

IMPROVEMENT IN GRAIN-DRILL FEEDS.

Specification forming part of Letters Patent No. 208,834, dated October 8, 1878; application filed July 9, 1878.

*To all whom it may concern:*

Be it known that we, PHINEAS P. MAST and CHARLES O. GARDINER, of Springfield, in the county of Clarke and State of Ohio, have invented certain Improvements in Grain-Drill Feed, of which the following is a specification:

This invention relates to that class of feeding devices which consist of a grain-receiving cup or case, and of a vertical feed-wheel, arranged to deliver the grain past or within its side face through the cup; and the invention consists in the employment of an adjustable gate, arranged to move inward laterally into and across the grain passage or channel for the purpose of limiting the size of the outlet passage or throat, and thereby controlling the discharge of grain, whereby the rate of delivery may be controlled without changing the speed of the feed-wheel.

The invention also further consists in the peculiar construction of the gate and wheel, and in other details hereinafter described.

Figure 1:
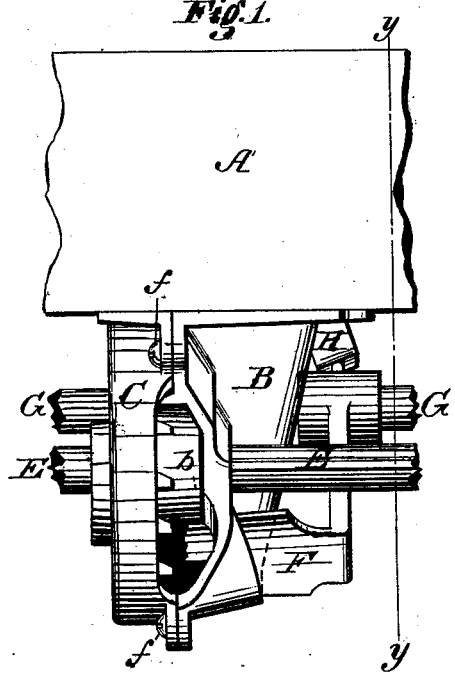
Figure 2:
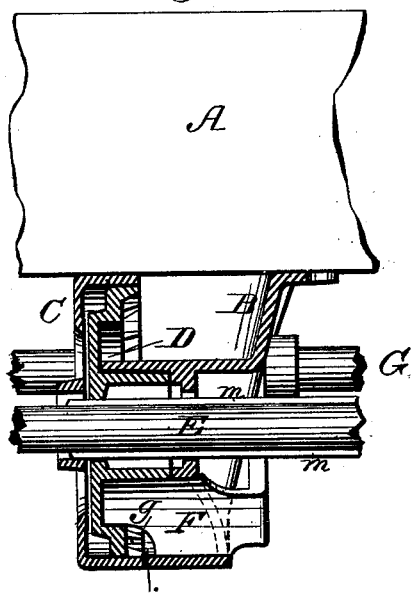
Figure 3:
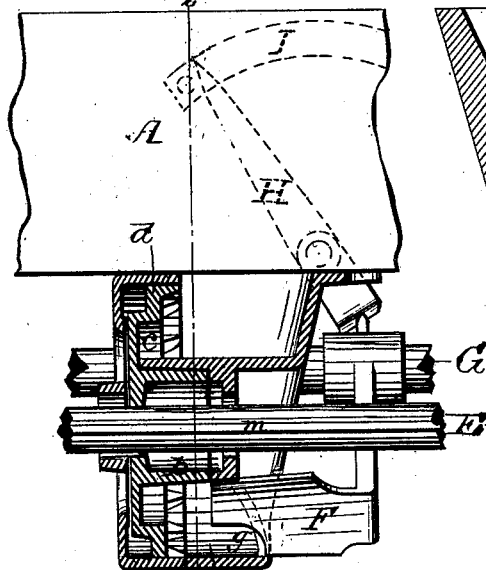
Figure 4:
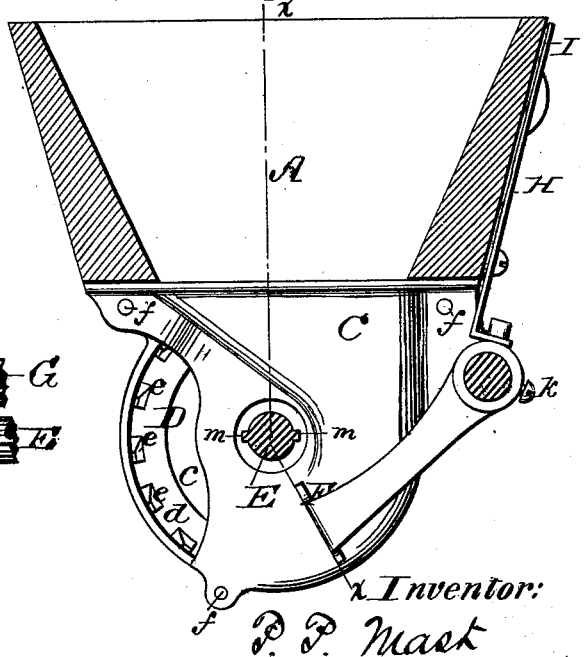

Figure 1 represents a rear elevation of our improved feeder with the driving and feed-regulating shafts; Fig. 2, a vertical section of the same on the line $x\,x$ of Fig. 4, showing the gate in position to cause the discharge of the minimum amount of grain; Fig. 3, a similar view, showing the gate adjusted to permit the maximum discharge; Fig. 4, a side elevation of the device with the shafts in section on the line $y\,y$ of Fig. 1; Fig. 5, a section on the line $z\,z$ of Fig. 3; Fig. 6, a central section of the feed-wheel; Fig. 7, an elevation of the regulating-gate; Figs. 8, 9, 10, sectional views, showing the gate in different positions, and illustrating the different forms of the channel or throat under the different adjustments of the gate.

A represents a grain box or hopper, to which a series of the feeding devices will be attached in line and driven by a single shaft, as usual. B C represent the two parts forming the cup or case, into which the grain is received from the hopper, and through which it is delivered by the action of the feed-wheel D, which is driven by means of the central shaft, E, extending through the wheel and cup, as shown.

The part B of the cup is made in substantially the ordinary form, with a flaring or hopper mouth at its top, and with a curved channel or passage-way, $a$, extending downward and backward below the shaft, and terminating in a slightly-elevated mouth, as usual. The feed-wheel D, which is made of a circular form, is applied to and closes the outer side of the part B, covering the grain passage or channel $a$, and rendering it necessary for the grain to pass downward through said channel, and through or against the side face of the wheel, in order to escape at the rear, the general construction and mode of operation being essentially the same as in other force-feeds now in use.

As shown in the drawings, the feed-wheel is provided on the inside with a central cylindrical hub, $b$, the end of which has a bearing in a corresponding cavity. In the part B of the cup the wheel, instead of having its inner face made of a flat form, is provided immediately around the hub with an annular groove or channel, $c$, around or outside of which the wheel has a projecting or overhanging portion, $d$, which is preferably provided at the extreme outer edge with forwardly-projecting teeth $e$, to assist in the delivery of the grain. The part C of the feed cup or case serves to hold the wheel D in position, and is made of a skeleton form, and adapted to fit over and around the back of the feed-wheel, and is united to the part B by screws $f$, as shown in Figs. 1 and 4.

F represents the feed-regulating gate, having one end inserted and arranged to slide through a slot in the part B of the feed-case, the gate being made of such form and so arranged as to slide into and across the grain passage or channel at a point a short distance in advance of its mouth or delivery, in such manner as to diminish the size of the passage at that point, thereby limiting the outward flow of seed to a greater or less extent, as occasion may require.

The gate is preferably made with a flat face, standing radially with reference to the wheel, and arranged to move in a plane parallel with the axis of the feed-wheel and shaft.

The form of the gate and its position with reference to the wheel and cup may, however, be modified without changing its mode of action or departing from the limits of my invention. The inner end of the gate is cut away at the lower edge, as represented at $g$, Figs. 2 and 3, in such manner that when the gate is forced inward its end will enter the channel or passage $c$ of the feed-wheel and close the same, while a small channel or passage will remain between the lower corner of the gate and the outer portion of the wheel, as shown at $i$, Figs. 2 and 10.

On referring to Figs. 8, 9, and 10, it will be seen that owing to the form of the gate and wheel the grain throat or passage between them is changed in form as well as in size by the adjustment of the gate, the channel presented when the gate is wide open being of the wide and elongated form shown in Figs. 8 and 9, adapted for the feeding of oats and other large grain, while the passage presented when the gate is closed, or nearly so, is small in both directions, and adapted for the feeding of wheat and other small grains. It will thus be seen that by the adjustment of the gate the throat or passage may not only be increased and diminished in size to regulate the rate of discharge, but also varied in form to adapt the device for the successful feeding of different grains.

For the purpose of operating the gate, any suitable mechanism may be employed; but the arrangement preferred is that of the longitudinally-sliding rod or shaft G, which will be extended the entire length of the machine through the ends of all the regulating-gates of the series.

For the purpose of adjusting the gate, I employ a lever, H, pivoted upon the grain-hopper, and arranged to engage at its lower notched end upon the stud on one of the feed-regulating gates, or of the shaft G.

An indicator-scale or dial-plate, I, located upon the hopper beneath the lever, will enable the attendant to readily adjust the lever, and thereby the gates, in such manner as to cause the sowing of any given amount of grain per acre. In order that the gates may be readily adjusted upon the shaft, they are attached thereto by means of set-screws $k$, the shaft being provided with a longitudinal groove, in which the ends of the screws bear, so as to hold the gate more firmly and accurately in place. As a means of rotating the feed-wheels, the driving-shaft E, which is made of a round form, is provided on opposite sides with two ribs or splines, $m$, seated in corresponding grooves in the wheel.

The use of the double ribs will form the subject of a separate application.

While it is preferred to have the feed-wheel with the shoulder or offset in its face of the form shown, it is obvious that the arrangement may be reversed and the groove or channel located at the periphery, or that the shoulder may be otherwise changed in form or arrangement, provided the gate is made of corresponding form, so that its adjustment will vary the size of the seed-passage both vertically and laterally, in order to adapt the device for feeding grains of different sizes.

This feature of the invention consists, broadly, in providing the feeding-face of the wheel with a shoulder or offset in cross-section, and in shaping the end of the gate to correspond therewith.

Having thus described our invention, what we claim is—

1. The combination, substantially as shown and described, of a vertical feed-wheel, D, a feed cup or case, B, and a feed-regulating gate, F, arranged to move in a right line into and across the grain-channel from one side, so as to diminish its width and decrease the discharge by holding back a portion of the grain.

2. The combination of the vertical feed-wheel having a grooved or channeled side face, a feed-cup, B, and the flat feed-regulating gate E, arranged to slide into said cup toward and at substantially right angles to the face of the wheel.

3. The combination of the vertical feed-wheel, having the annular shoulder in its side face, with the feed-cup B and the transversely-moving feed-regulating gate F.

4. In a seeding-machine, the combination of a feed wheel and cup containing a grain channel or passage, having in cross-section substantially parallel top and bottom walls, with a laterally-moving slide or gate extending across said channel from top to bottom, and serving, in contradistinction to those gates which merely diminish the outlet-opening without affecting the stream within the cup, to diminish the transverse width of the moving stream of grain within the cup, and thereby lessen the discharge.

5. In combination with a vertical feed-wheel, a laterally-moving gate, F, provided with a depression or recess, $g$, at its inner end, for the purpose described.

6. In combination with the feed-wheel D having the annular groove $c$, the transversely-moving gate F, having the recess or depression $g$ in its end, the two being arranged for joint operation, substantially as described and shown.

7. In combination with the gate F, having the depression or cavity $g$ in its end, the feed-wheel D, provided with the peripheral teeth $e$, to insure the delivery of the grain through the recess $g$.

PHINEAS P. MAST.
CHARLES O. GARDINER.

Witnesses:
J. B. CHRISTIE,
T. J. KIRKPATRICK.